(12) United States Patent
Balcik

(10) Patent No.: US 10,384,157 B2
(45) Date of Patent: Aug. 20, 2019

(54) EXHAUST AIR DUST FILTERS WITH TELESCOPIC CLEANING SYSTEM APPLYING INTERNAL BI-DIRECTIONAL AIR FLOW PRINCIPLE

(71) Applicant: Adeba Muhendislik Danismanlik Halkla Iliskiler Insaat Sanayi Ve Ticaret Anonim Sirketi, Izmir (TR)

(72) Inventor: Hasan Engin Balcik, Izmir (TR)

(73) Assignee: Adeba Muhendislik Danismanlik Halkla Iliskiler Insaat Sanayi Ve Ticaret Anonim Sirketi, Ismir (TR)

( * ) Notice: Subject to any disclaimer, the term of this patent is extended or adjusted under 35 U.S.C. 154(b) by 0 days.

(21) Appl. No.: 15/546,575

(22) PCT Filed: Mar. 8, 2016

(86) PCT No.: PCT/TR2016/050063
§ 371 (c)(1),
(2) Date: Jul. 26, 2017

(87) PCT Pub. No.: WO2017/010957
PCT Pub. Date: Jan. 19, 2017

(65) Prior Publication Data
US 2018/0111076 A1   Apr. 26, 2018

(30) Foreign Application Priority Data

Jul. 14, 2015   (TR) ............................... a 2015 08782

(51) Int. Cl.
*B01D 46/00*   (2006.01)
(52) U.S. Cl.
CPC ..... *B01D 46/0058* (2013.01); *B01D 46/0067* (2013.01); *B01D 46/0068* (2013.01); *Y02A 50/2355* (2018.01)

(58) Field of Classification Search
CPC ...... B01D 46/00; B01D 46/0057–0071; B01D 46/0082; B01D 46/023; B01D 46/442; Y02A 50/2355

(Continued)

(56) References Cited

U.S. PATENT DOCUMENTS

| 2002/0029692 A1 | 3/2002 | Leibold |
| 2004/0261375 A1 | 12/2004 | Scheuch |
| 2009/0107337 A1* | 4/2009 | Vu .................... B01D 46/0021 95/279 |

FOREIGN PATENT DOCUMENTS

| DE | 3043106 A1 | 6/1981 |
| WO | 2014133474 A2 | 9/2014 |

OTHER PUBLICATIONS

International Search Report for corresponding International Application No. PCT/TR2016/050063.

* cited by examiner

*Primary Examiner* — T. Bennett McKenzie
(74) *Attorney, Agent, or Firm* — Egbert Law Offices, PLLC

(57) ABSTRACT

Industrial air filtering technology and a new component for their internal cleaning system are disclosed leading to dramatic increase in system cleaning efficiency as well as energy efficiency. A telescopic cleaning mechanism is able to move at the front of filtering cassette bodies via linear guiding rollers and servo motors transfer cleaning air into the cassettes and extends till to the end of surfaces for enabling better cleaning functionality. A suction blockage paddle further enhances cleaning performance via avoiding suction power only at the right time that is needed.

3 Claims, 14 Drawing Sheets

(58) Field of Classification Search
USPC .................................... 55/282–305; 96/417
See application file for complete search history.

EXHAUST AIR DUST FILTERS WITH TELESCOPIC CLEANING SYSTEM APPLYING INTERNAL BI-DIRECTIONAL AIR FLOW PRINCIPLE

TECHNICAL FIELD

This invention; involves an internal cleaning system of centralized extraction and filtration units of industrial exhaust gases such as product dusts or process related emission gases that are generated during related process to be extracted from operational environment and to be discharged to the atmosphere within the limits of environmental regulations.

Invention mainly covers a special telescopic cleaning system to be used in such extraction systems and filters, which are able to clean internal filtering materials by a telescopic unit, travelling all through the length of each filter cassettes. Cleaning head (nozzle) is attached to the end of the telescopic unit applies/blows low pressure air opposite to regular air flow into the filter cassettes and generates a ripple effect on to the bags of the cassettes. As a result, the filter cassette surfaces clean more effectively.

PRIOR ART

Current technology uses Compressed Air which is generated at the centralized compressor units and is then applied to the filters (>6 bar), with regular intervals against the regular air flow direction leading the dust to leave off the surface of filter bags, drops down in main filter body and consequently, cleaning of filter bags.

Existing design/system works relatively in good condition but with several weaknesses. Those weaknesses are; high energy consumption for internal filter cleaning functionality, weaknesses and pressure losses in air transfer pipes, fault identification and maintenance difficulties as well as frequent cleaning necessity of filters due to poor cleaning performance of cleaning functionality.

Because of these disadvantages, current filters cleaning performance and the consequent filtering capacities decrease gradually during operation and performs far below then expectations and energy efficiencies.

When the filter bags are not properly cleaned, gradual dust accumulation leads to partial bag choke up's and increases air flow velocity at the remaining sections and diversely increases pressure loss of the filter. This causes the main suction fan to operate at a higher power rate and therefore leads to higher energy consumption. In other words, whenever the filter bag surfaces are not clean homogeneously and completely, the deep part of the filter bags becomes passive during the filtration process.

Beside, current system filter bag surfaces are cleaned by applying high pressure compressed air against the air flow which leads the filter bags to deteriorate very quickly and aged due to high frequency of powerful cleaning pulses, faster deformation and frequent replacement necessities. In other words, this causes extra maintenance expense and even the loss of production because of the operating systems frequent down times.

Also if not noticed immediately, filter units may blow out dust to atmosphere that is well above the environmental emission limits. The may even cause health risks for operators and carry the risk of non-compliant factory operations and penalties from environmental bodies to factories.

To eliminate the above mentioned disadvantages, a patent application is filed as "Telescopic cleaning system for exhaust air filters", and published as TR 2013 02290 (WO2014133474 A2). This patent application also has telescopic mechanism and attached nozzle works with the same principle applying cleaning air within the filter cassettes covering all surfaces for efficient cleaning. The system is controlled by PLC and servo motors on linear guide rollers holding Telescopic Cleaning system, which is entering to each filter cassette (bags) and efficiently cleans the entire surfaces.

However, some technical details need to be further improved for the above mentioned application.
 Telescopic mechanism opens inside the filter cassettes and while the body is being extended, a deflection observed on the system that is jeopardizing the long term reliable performance of mechanism
 Cleaning air exit is all through the length of the telescopic mechanism that is so long/wide to transfer the cleaning air impulse adequately & equally to complete filter bag leading to relatively low cleaning efficiency for the bags.
 Depending on the filter capacities and necessities to use double telescopic mechanism, a risk observed as the dropping dusts and particles to be stuck within the cassettes and have a negative effect on cleaning performance.

As the above mentioned disadvantages observed on the previous application TR2013/133474 (WO2014/133474), it is needed to improve the mechanical design and apply for improved system as to be also patented.

THE PURPOSE OF INVENTION

This invention is related to a new telescopic cleaning system on industrial air dust filtering units covering all above mentioned needs by eliminating several disadvantages and improving the general performance of air cleaning systems.

An objective for this invention is; to improve our mechanical design to increase cleaning efficiency and energy savings values.

An objective for this invention is; to eliminate the deflection of the telescopic mechanism by the opening load on all distances within the cassettes and the risk of deformation to the mechanical system.

An objective for this invention is; to change the cross section of the cleaning heads (Nozzles) exit geometry in order to increase cleaning efficiency of the filter bags and increase the energy efficiency of the system.

An objective for this invention is; to change the cross section of the cleaning heads (Nozzles) to minimize mechanical resistance and reduce the pressure of supplied compressed air for cleaning.

An objective for this invention is; to add a new mechanism (Regular air flow blockage paddle) that will allow us to generate the ripple effect on the filter surface by stopping the regular air flow while cleaning nozzle applies air into the cassette that is so called air flow blockage paddle, which further increases the cleaning performance.

An objective for this invention is; to eliminate pushed away dusts and particles not to be sucked by adjacent cassette by applying a rule as to leave a free cassette in between 2 unit of telescopic cleaning mechanism applications.

An objective for this invention is; to increase the mentioned telescope's mechanical strength in order to reduce maintenance expenses and increase the life span of the system.

Below is the detailed explanation of the invention with referring figures for easier and clear understanding of all infrastructural and characteristic details with all mentioned advantages. Hence, it is requested to evaluate the invention through the following expressions and figures.

REFERENCE NUMBERS

Figure 1:
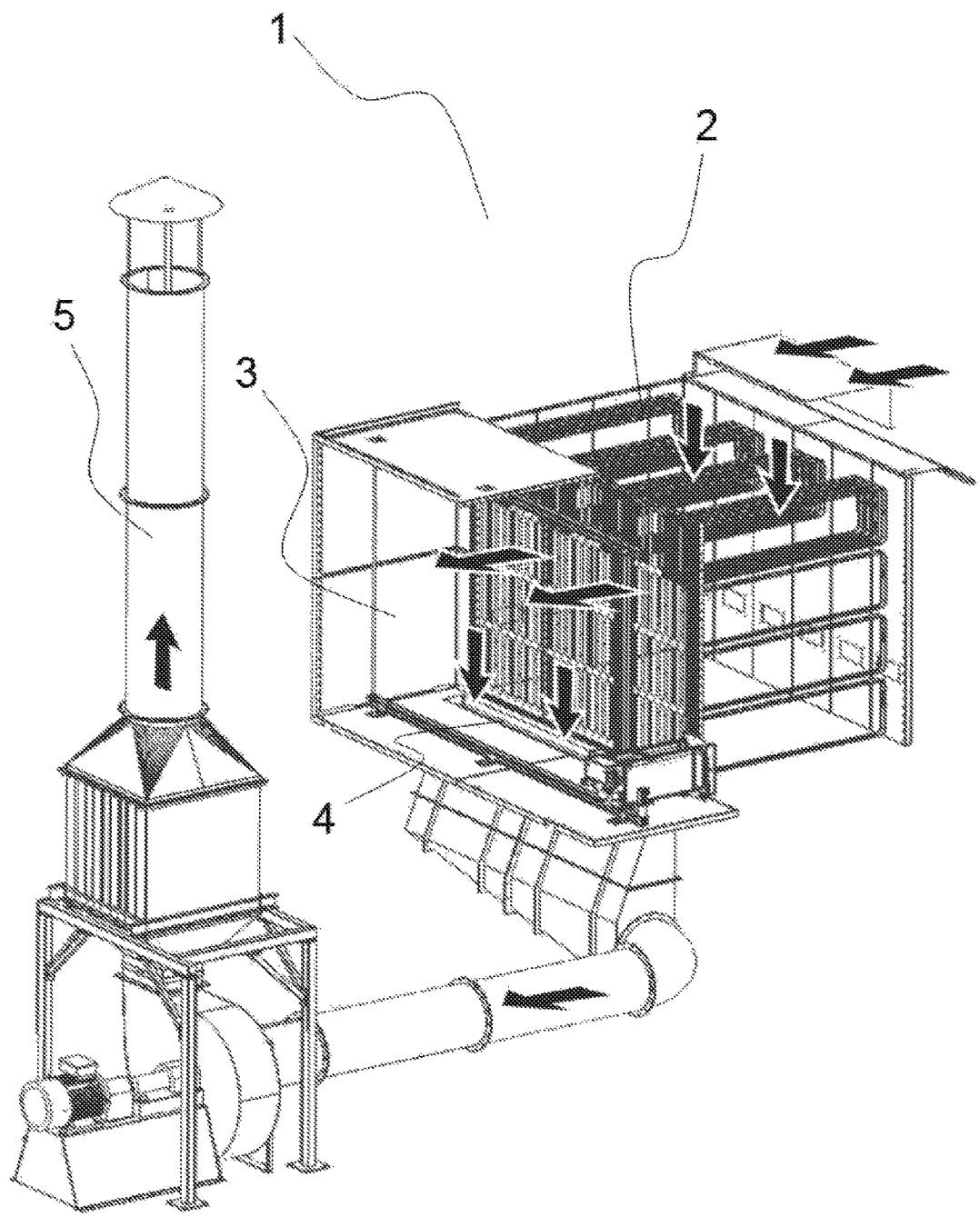
FIG. 1; A perspective view of above described air filtering unit with the application of 2× telescopic cleaning system with the preferred option of 4 levels of filter cassettes.

1. Filter Unit
2. Dirty Air chamber
3. Clean Air chamber
4. Clean Air exit channel
5. Chimney
6. Vertical linear shaft
7. Horizontal linear shaft
8. Telescopic cleaning mechanism (Unit)
   8.1 Suction blockage paddle
   8.2 Nozzle
9. Cassette group
   9.1 First set of cassettes
   9.2 Second set of cassettes
   9.3 Third set of cassettes
   9.4 Forth set of cassettes
10. Cassettes entry
11. Nozzle support rollers (wheels)

DETAILED EXPLANATION OF INVENTION

This detailed explanation gives further information about the mentioned telescopic cleaning system and enlightens the working principle of the mechanical system related to the technical advantages mentioned on the "purpose of invention" section of this application.

FIG. 1 shows the exhaust air filtration systems (1) air flow direction and within the same system (1) sections of the filter system where air travels.

Figure 2:
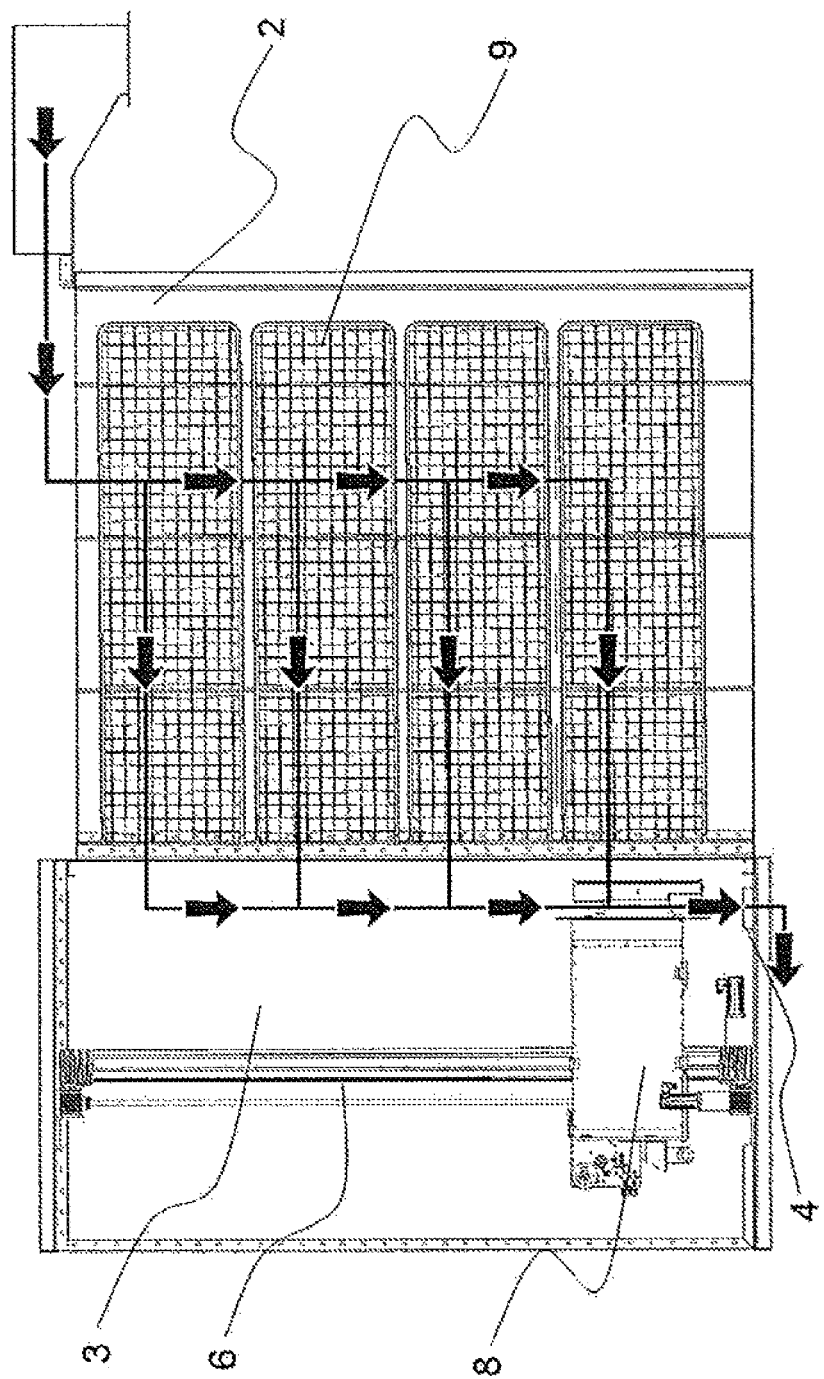
FIG. 2; Described air filtering unit at side view when telescopic cleaning mechanism at home (reference) position while showing the system regular air flow direction with arrows.

FIG. 2 shows the air filtration systems (1) perspective view with the filtration systems cassette group (9) where air travels through. In Known technologies, dirty air goes through the dirty air chamber (2) first, dust and unwanted particulars gets hold by of filter group's cassette bags (9). The cleaned air without any particles and dust goes to clean air chamber (3) afterwards gets discharge through clean air exit channel (4) to the chimney (5) and released to the environment.

This is the working principle of most of the filtration units (1). In this system, one of the most important factors is the filter cassette bag's fabrics. These bag fabrics get the air through them and hold the unwanted particles on their surfaces but if not cleaned properly over the time, accumulation occurs and filter bag fabrics get blocked by the particles. In this invention, filter cassette bag fabrics are cleaned by applying/blowing low pressure compressed air below 3 bar (<3 bar) in an opposite direction into the cassette bags to regular air flow. This bi-directional air flow generates the ripple effect on to the cassettes bags surface and cleans efficiently. This way of cleaning eliminates current systems disadvantages which are mentioned above section.

Figure 3:
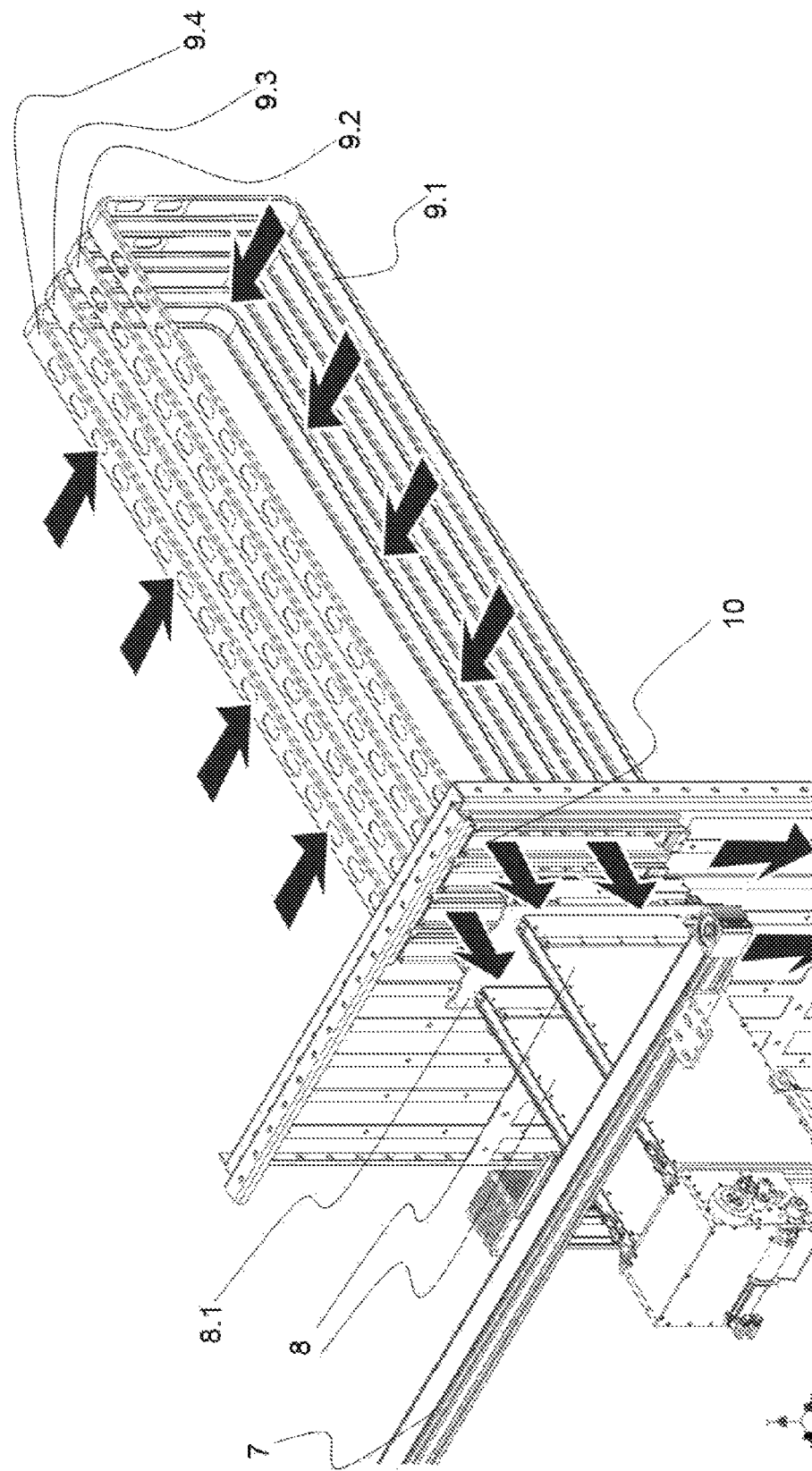
FIG. 3; Telescopic cleaning mechanism's cleaning starting position on the $1^{st}$ level of filter cassette group with the filtering systems regular air flow directions.

FIG. 3 shows the new design and telescopic cleaning systems starting position prior to cleaning. As seen in FIGS. 4 to 11, telescopic mechanism (8) is made of telescopic rectangular panels with a blowing nozzle (8.2) attached at the end of the unit. Working principle will be explained on the set of 4 filter cassettes (9) version for easier understanding. As mentioned on above sections single or double telescope mechanism (8) selection is depending on the required capacity but for this instance, we are using double telescope to demonstrate all details. Double telescope nozzles (8.2) complete the cleaning cycle in a shorter time with more effective cleaning. Double nozzle telescopic unit operates leaving one cassette space in between. This method eliminates the possibility of particles being stuck in between, (when opposite air is blown into the bags, inflation may cause beside bag to touch the inflated one). This is to say that double telescope (8) unit works on first set of cassette (9.1) and third set of cassette (9.3) on the same time and then next step as second set of cassette (9.2) and forth set of cassette (9.4).

Figure 4:
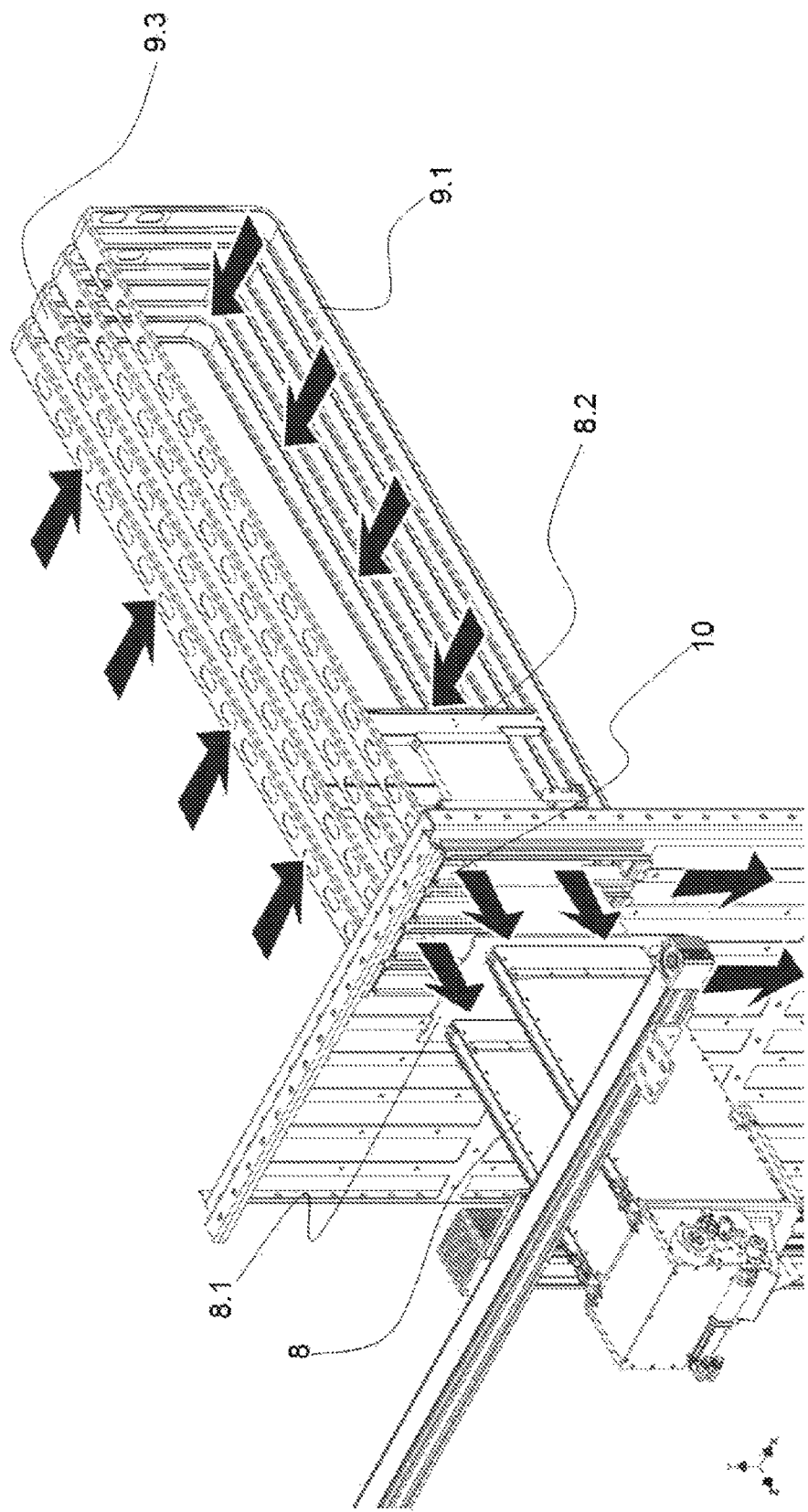
FIG. 4; A perspective view of the double telescopic cleaning mechanism (unit) positioning at the $1^{st}$ step of cleaning activity right before cleaning air application starts as well as the blockage paddle position remains open and regular air flow continues.

FIG. 4 shows, nozzles (8.2) entry into the first set of cassettes (9.1) and third set of cassettes (9.3) while regular air flow continues for filtration.

Figure 5:
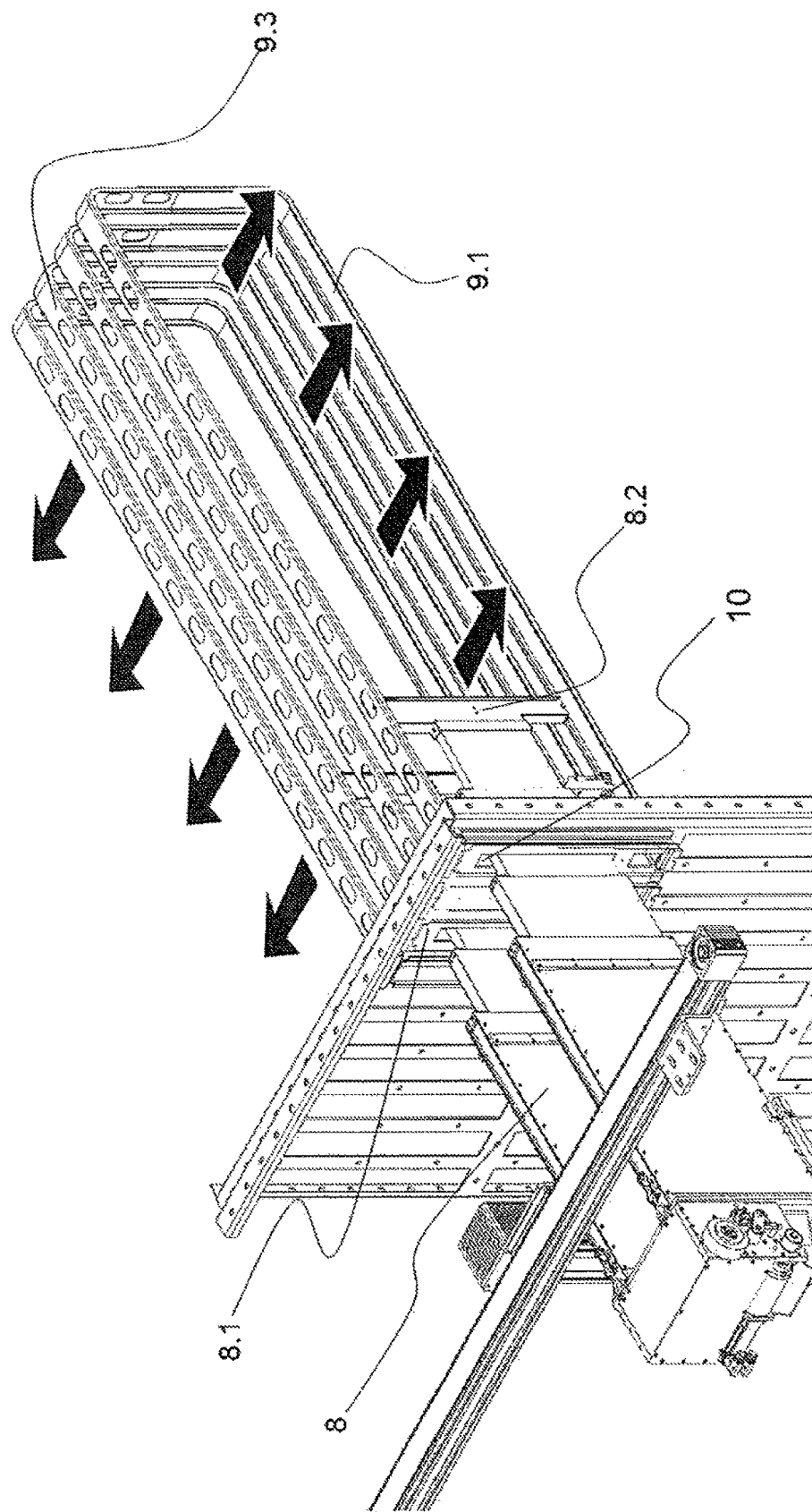
FIG. 5; A perspective view of the units positioned at the $1^{st}$ step coordinate as blockage paddle get closed and stops the regular air flow suction power on the selected cassettes and nozzles blow cleaning air at low pressure air (<3 bar) towards the filter cassette bags from inside.

FIG. 5 shows, Positioning of the Double air blowing nozzles (8.2) by telescopic mechanism for the $1^{st}$ stage, air flow blockage paddle (8.1) closes the cassettes entry (10) opening. When cassette entry (10) is closed, nozzles (8.2) blowing starts. Cleaning air flow direction from the nozzles (8.2) shown in this figure. Ripple effect applies to the cassette bags by opposite air flow for accumulation to remove the surface when the nozzle (8.2) stops blowing air and regular air flow restarts.

Figure 6:
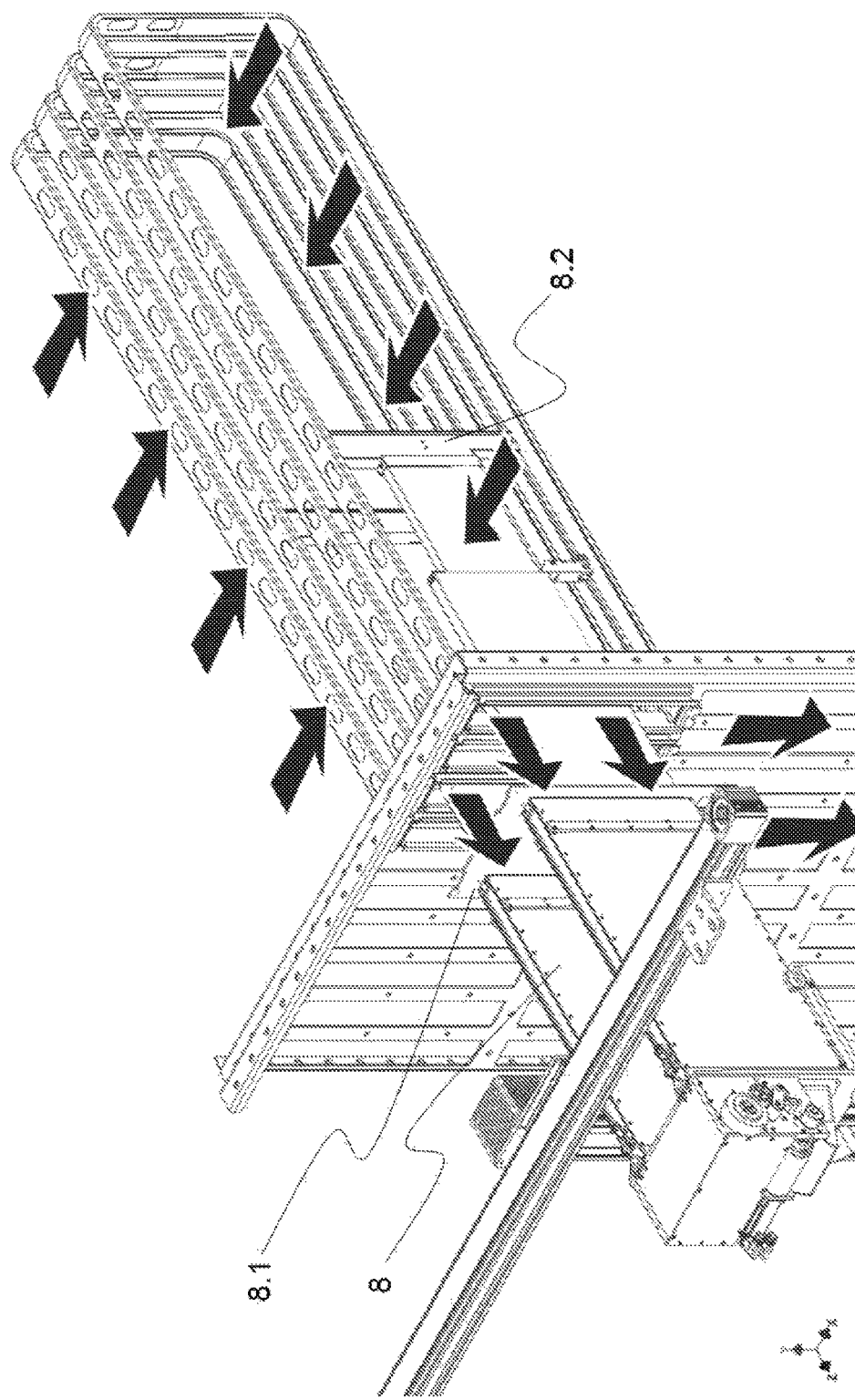
FIG. 6; A perspective view of the units being travel to the $2^{nd}$ step coordinate for cleaning, while blockage paddle gets open and re-generates filtration & suction power that pulls back the filter bags to the cassette surfaces that is generating ripple effect on the filter cassette bags for better cleaning.

FIG. 6 shows, nozzles (8.2) positioning for the $2^{nd}$ stage air flow. Blockage paddle (8.1) is open and cassettes entry (10) is also open for regular air flow. During this period till the nozzle (8.2) reaches to $2^{nd}$ stage, nozzles (8.2) doesn't blow cleaning air and regular air flow re-generates the vacuum to the bags. Opposite air blows by the nozzles (8.2) from inside the cassettes and vacuum by the regular air flow when air flow blockage paddle opens/closes creates ripple effect to the bags that helps sticky particles also to drop off from the bags surface.

Figure 7:
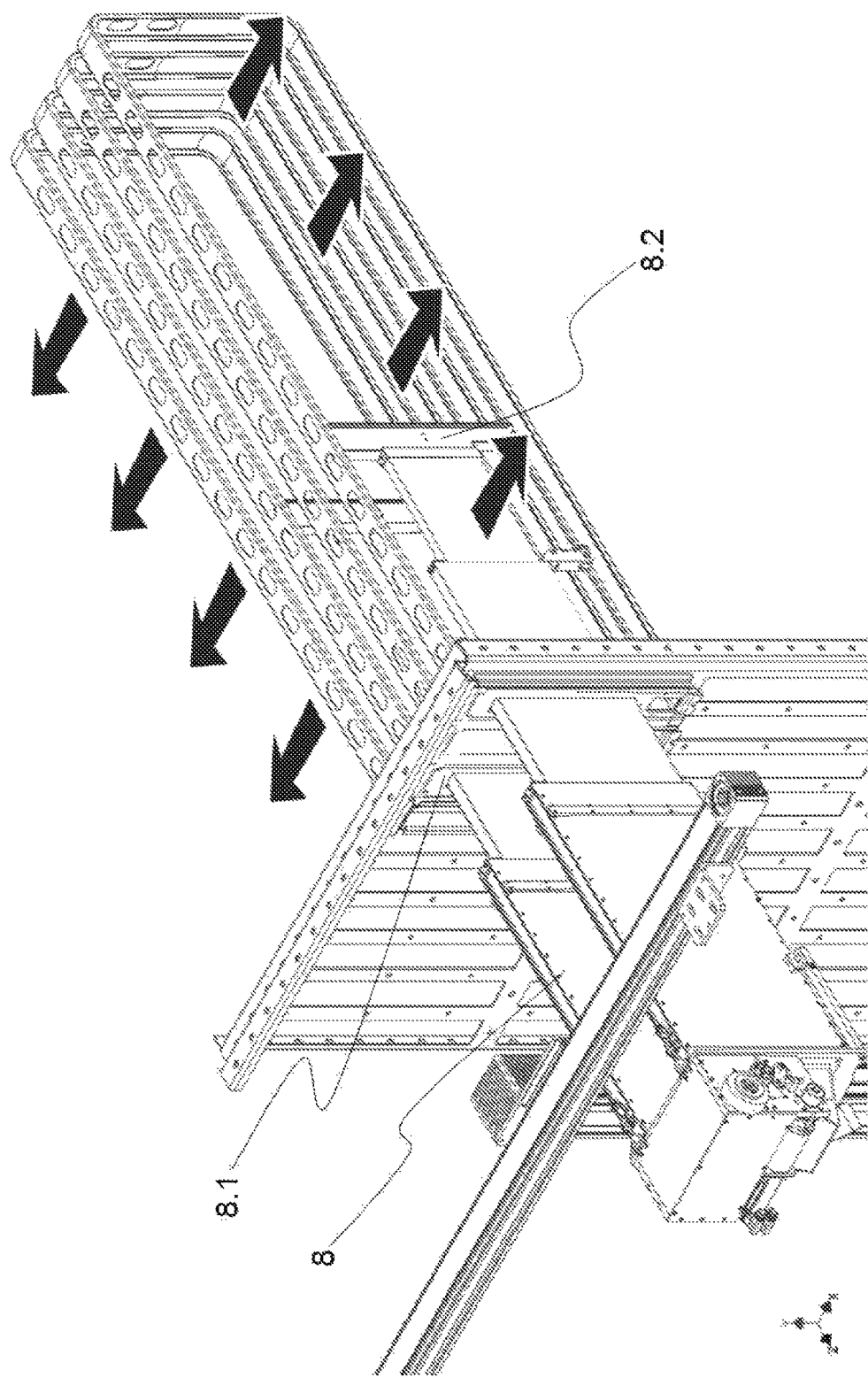
FIG. 7; A perspective view of the units positioned at the $2^{nd}$ step coordinate as blockage paddle gets closed for the second time, stopping regular air flow, while nozzle starts blowing up cleaning air at low pressure air (<3 bar) towards the filter cassettes bags from inside.

FIG. 7 shows, air flow blockage paddle (8.1) closes and stops again the regular air flow vacuum from the cassettes. Nozzles (8.2) reach to $2^{nd}$ position by telescopic mechanism and blows the air from inside of the cassettes in order to drop the particles from the bags.

Figure 8:
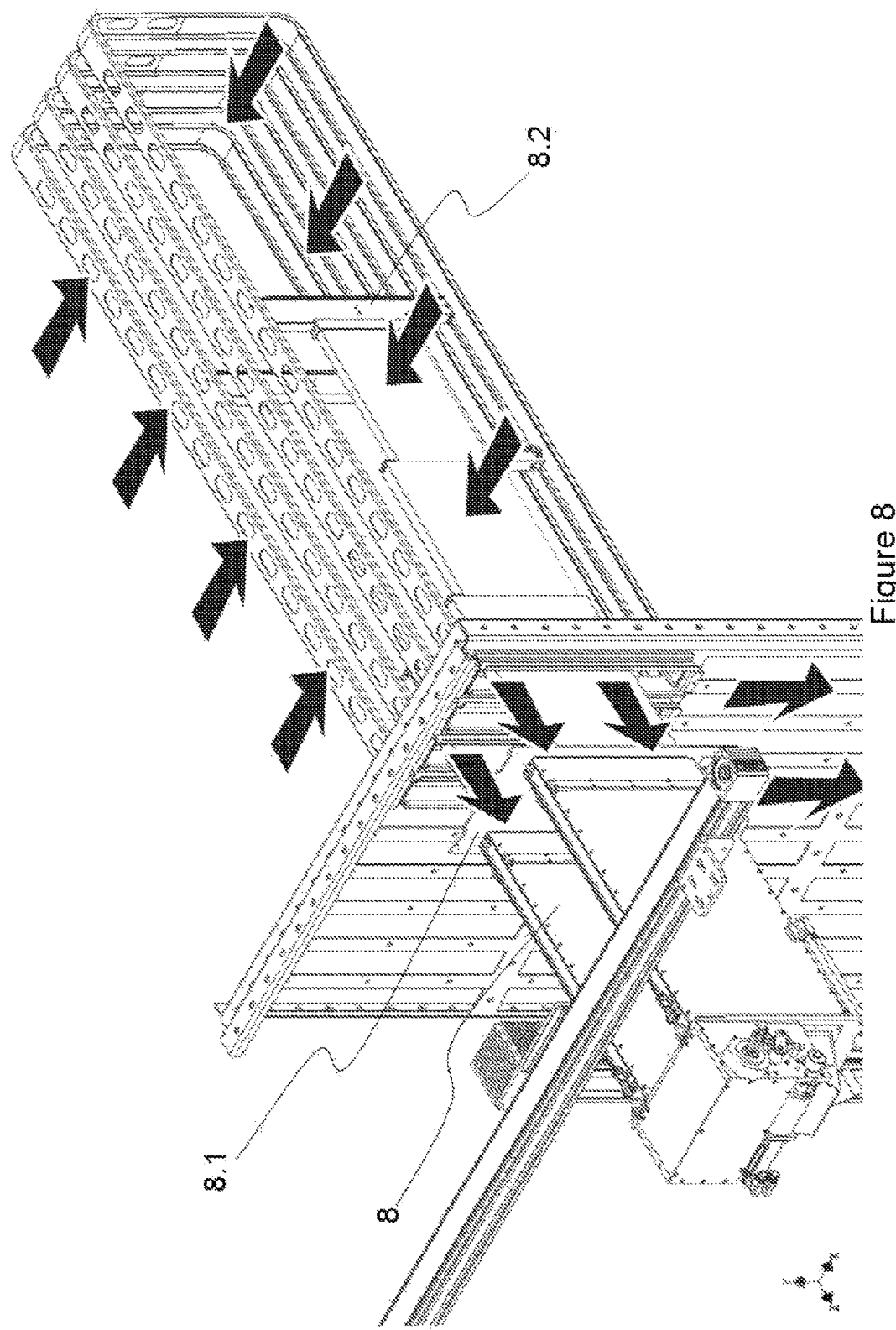
FIG. 8; A perspective view of the units, being travel to the $3^{rd}$ step coordinate for cleaning, while blockage paddle gets open and re-generates filtration & suction power that pulls back the filter bags to the cassette surfaces that is generating ripple effect on the filter cassette bags for better cleaning.
Figure 9:
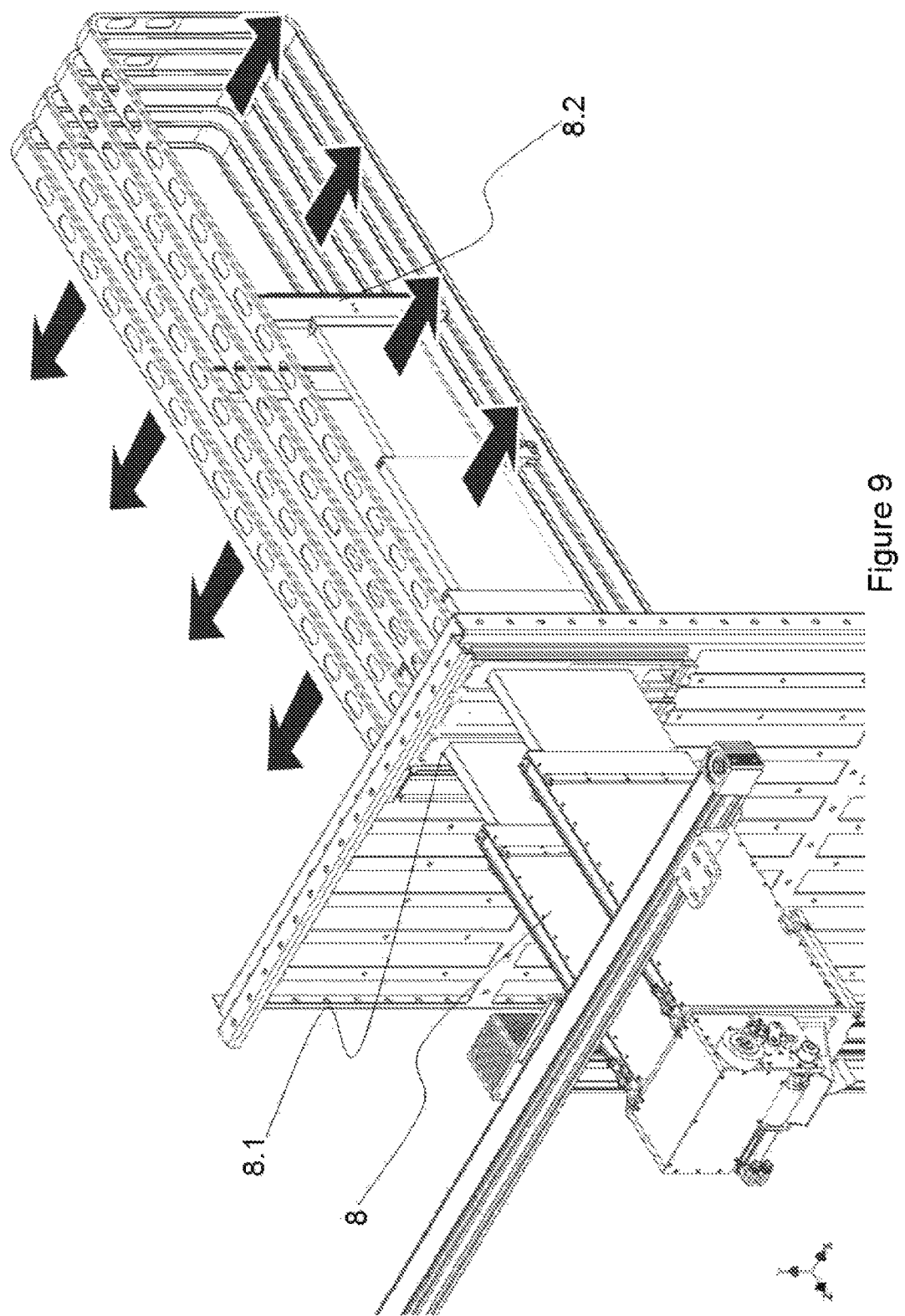
FIG. 9; A perspective view of the units positioned at the $3^{rd}$ step coordinate as blockage paddle gets closed for the $3^{rd}$ time, stopping regular air flow, while nozzle starts blowing up cleaning air at low pressure air (<3 bar) towards the filter cassettes bags from inside.

FIGS. 8 and 9 shows, nozzles (8.2) positions for the $3^{rd}$ stage by telescopic mechanism and repeats the $1^{st}$ and $2^{nd}$ stage cleaning process.

Figure 10:
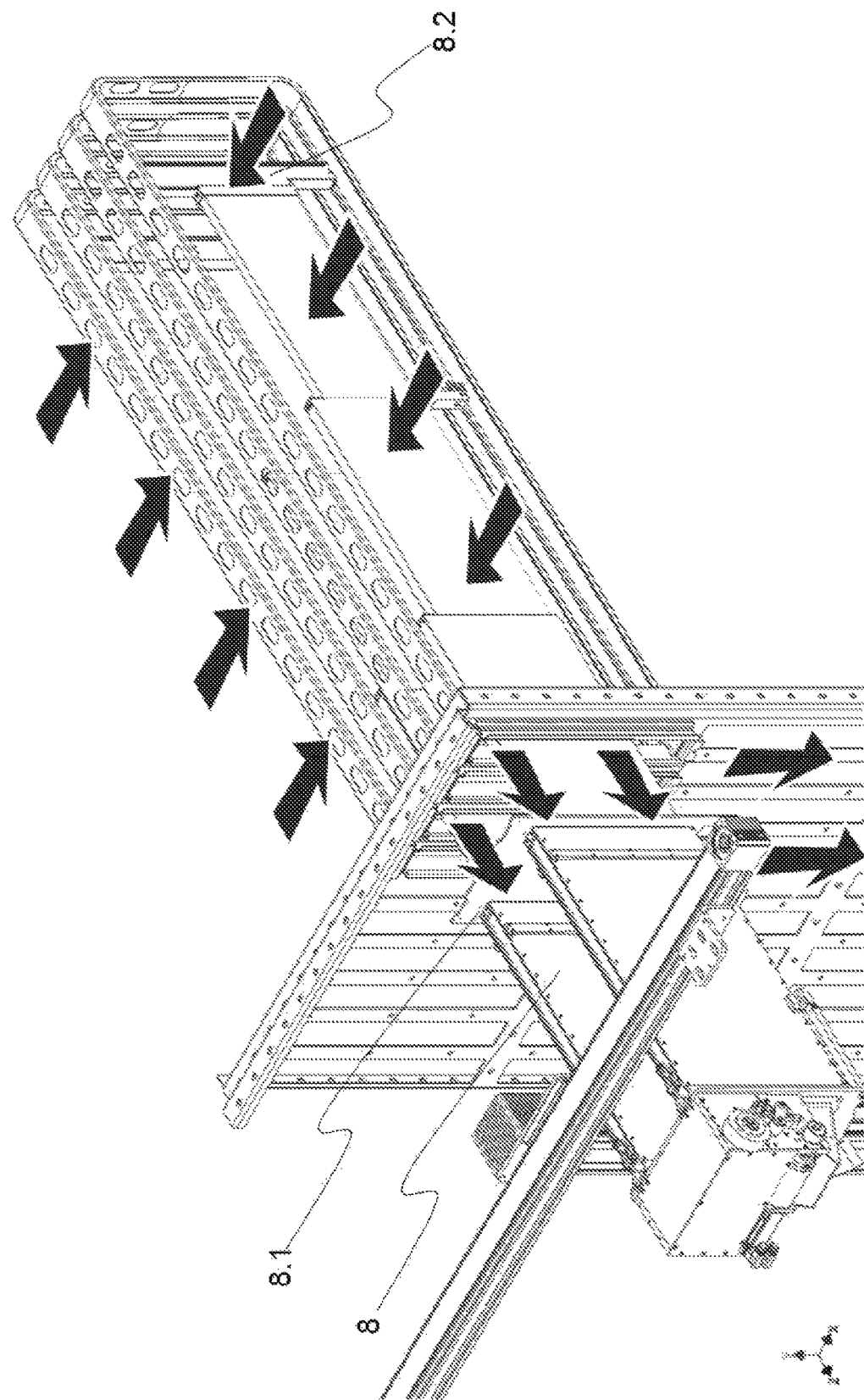
FIG. 10; A perspective view of the units, being travel to the $4^{th}$ step coordinate for cleaning, while blockage paddle gets open and re-generates filtration & suction power that pulls back the filter bags to the cassette surfaces that is generating ripple effect on the filter cassette bags for better cleaning.
Figure 11:
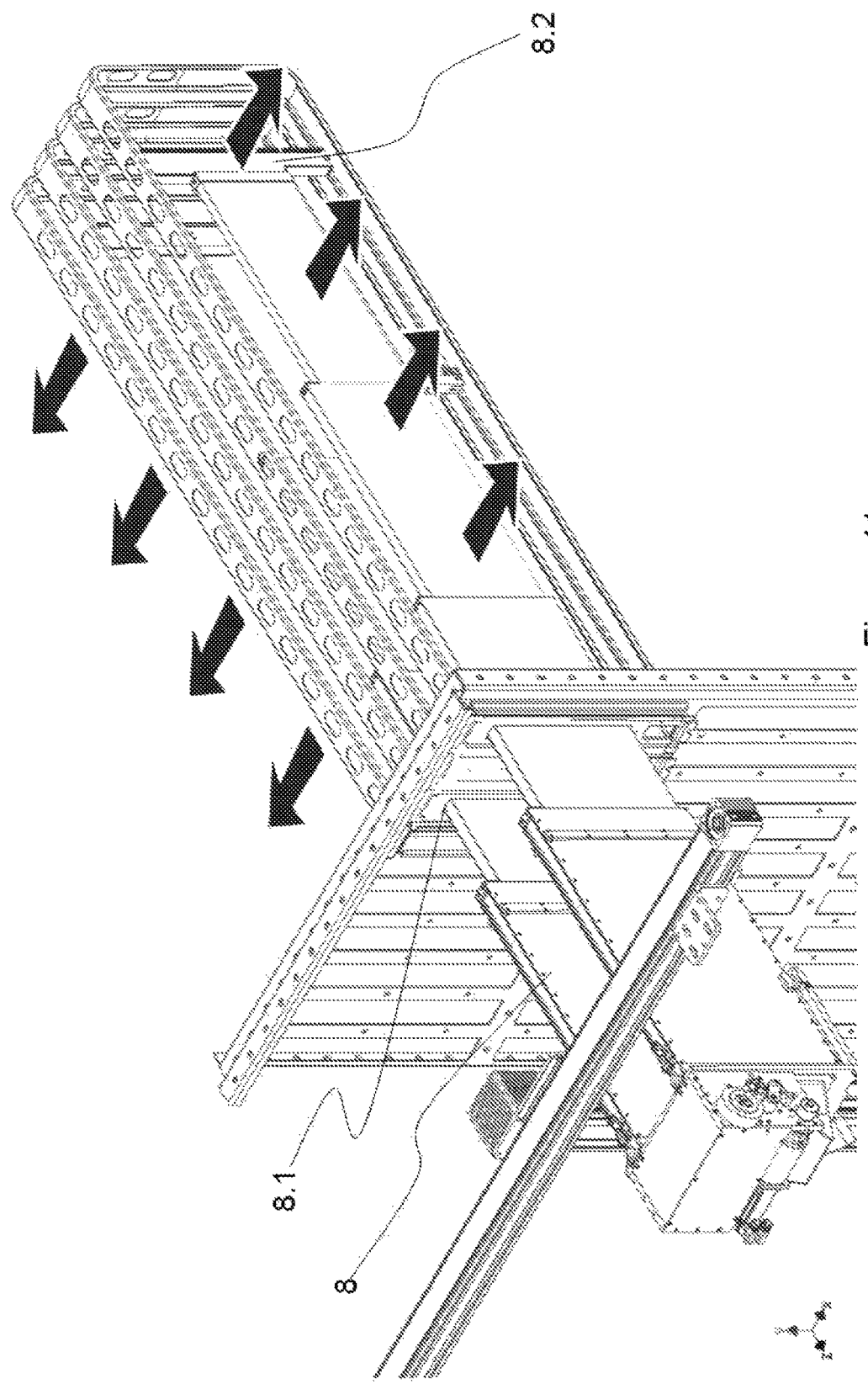
FIG. 11; A perspective view of the units positioned at the $4^{th}$ step coordinate as blockage paddle gets closed for the $4^{th}$ time, stopping regular air flow, while nozzle starts blowing up cleaning air at low pressure air (<3 bar) towards the filter cassettes bags from inside.

FIGS. 10 and 11 shows, nozzles (8.2) positions for the 4th stage by telescopic mechanism and repeats the $1^{st}$, and $2^{nd}$ and $3^{rd}$ stage cleaning process.

Nozzles (8.2) movements within the cassettes and 4 times bi-directional air flow (vacuum-blow) to the filter bags achieves the new cassette cleaning process which has never been applied before. With this principle, by stopping the regular air flow generated with the system vacuum pressure to the selected cassettes (8.1) air flow blockage paddle) and cleaning air blown by the nozzles (8.2) from inside of the cassettes from opposite direction makes the particles to drop from the bags easier. By this effective cleaning method to the filtering cassette bags, air filtration unit operates with much higher performance, higher capacity, and higher energy efficiency.

Figure 12:
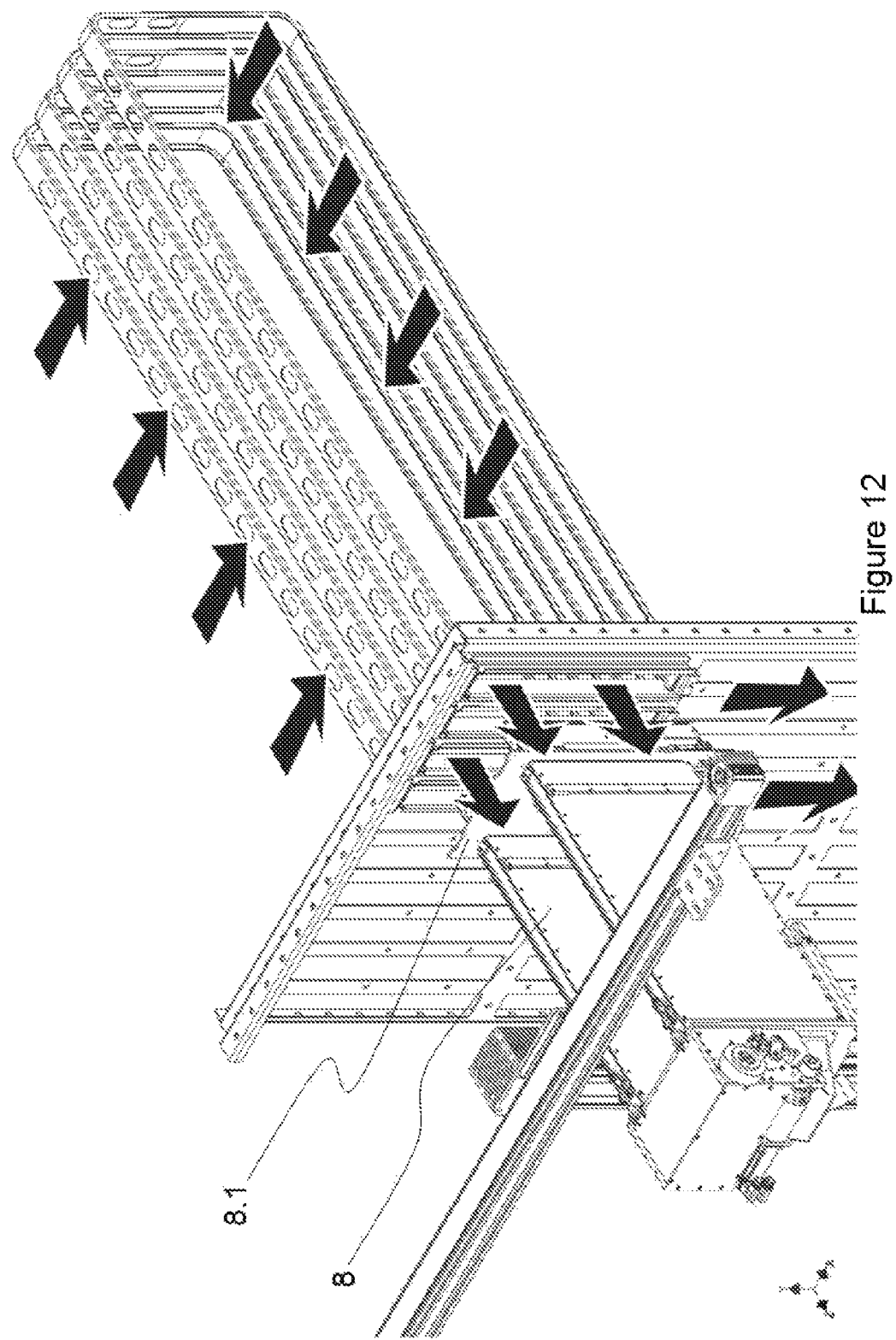
FIG. 12; A perspective view of the units, that Telescopic cleaning mechanisms and nozzles returns back to starting position after cleaning cycle finished for the cassette set and the filtering systems regular air flow continues.

FIG. 12 shows, after finishing $1^{st}$ cassettes and $3^{rd}$ cassettes cleaning telescopic cleaning mechanism's (8) and nozzles (8.2) moves back to starting point. The filtering systems regular air flow continues.

Figure 13:
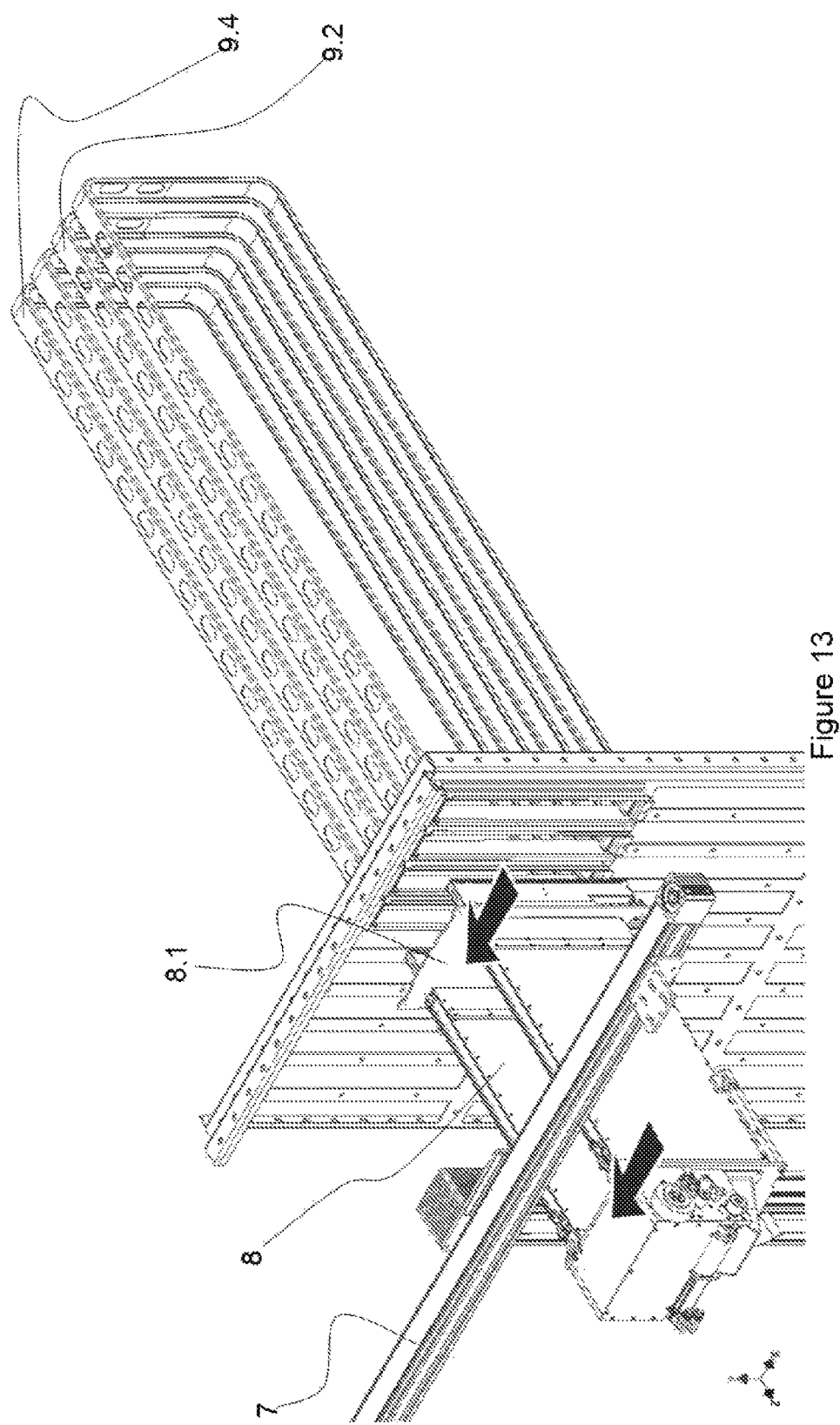
FIG. 13; A perspective view of units, that Telescopic cleaning mechanisms and nozzles moves to next set of cassettes within the row and positioned for the re-start of cleaning at next set.

FIG. 13 shows; Telescopic cleaning mechanism's (8) and nozzles (8.2) moves to next set of cassettes of second set of cassette (9.2) and forth set of cassette (9.4). When re positions, it starts the same cleaning process for the next set. By cleaning the cassettes leaving a space in between, this double nozzle (8.2) cleaning process prevents the particles from being stuck in between and more importantly prevents this released dust not be caught by adjacent cassette, which is working under system vacuum in parallel. This further supports cleaning functionality and eliminates the risk of low performance of the air filtering system.

Nozzles (8.2) telescopic cleaning mechanism (8) is driven by servo motor and moves between the 2 horizontal linear shafts (7), with the vertical linear shaft (6).

PLC control system and 2 additional motion control servo motors moves the telescopic cleaning mechanism (8) to desired coordinates, by X and Y axis movements to the telescopic cleaning mechanism (8) makes the unit to reach all filter cassettes (9) within the dirty air chamber.

Figure 14:
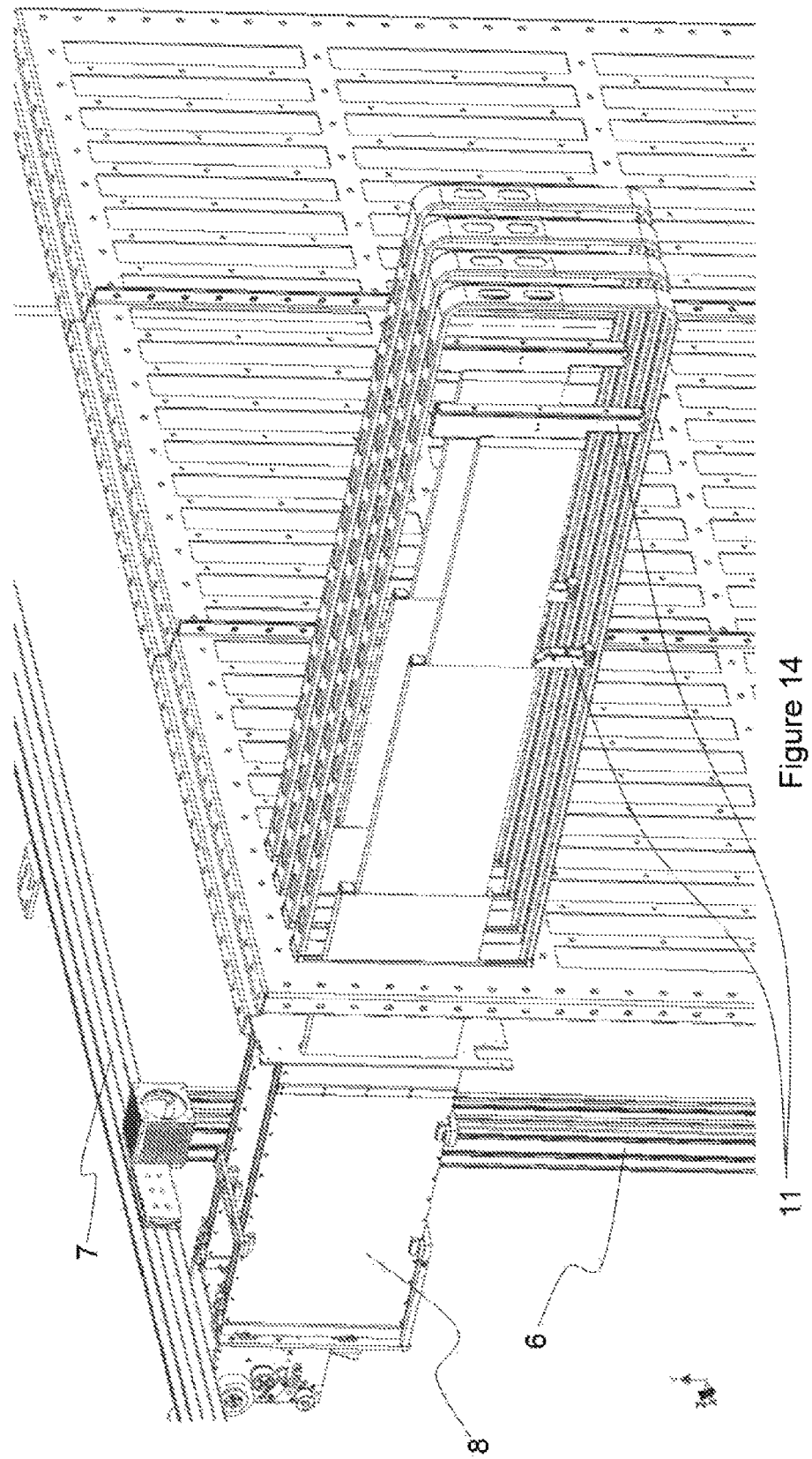
FIG. 14; A perspective view of units from opposite side, showing the supporting rollers on the Telescopic cleaning mechanisms to eliminate deflection during its travel through all the length and consequently increases the life span of the mechanical system.

FIG. 14 shows, a perspective view of the nozzles (8.2) and telescopic cleaning mechanism's supporting wheels (11). These supporting rollers have a wheeled mechanism which will support the telescopic cleaning mechanism (8) on opening distances for moment load deflection. It eliminates the deflection of the opening load on all distances within the cassettes and increases the life span of the mechanical system.

The invention claimed is:

1. A filter unit comprising:
a filtration system comprising a dirty air section, a cleaned air section and a plurality of cassette filters disposed between the dirty air section and the clean air section;
wherein each cassette filter comprises an interior and an entry opening;
wherein the filter unit further comprises a telescopic cleaning system for cleaning the plurality of cassette filters, wherein the telescopic cleaning system comprises:
a vertical linear shaft and a horizontal linear shaft with a first telescoping arm attached to the vertical linear shaft and the horizontal linear shaft;
wherein the first telescoping arm comprises a first nozzle located at a first position on the first telescoping arm and a first suction blockage paddle located at a second position on the first telescoping arm;
wherein during operation the vertical linear shaft and the horizontal linear shaft move the first telescoping arm to a first one of the cassette filters in order to position the first nozzle in front of the entry opening of the first cassette filter, the first telescoping arm then extends such that the first suction blockage paddle and the first nozzle move toward entry opening of the first cassette filter, the first suction blockage paddle then closes the entry opening of the first cassette filter and the first telescoping arm continues to extend the first nozzle within the interior of the first cassette filter while the first nozzle begins blowing cleaning air within the first cassette filter to clean the first cassette filter, after the first nozzle finishes cleaning the first cassette filter the first telescoping arm retracts the first nozzle and the first suction blockage paddle so that they are moved away from the entry opening of the first cassette filter.

2. The filter unit according to claim 1, wherein the telescopic cleaning system comprises a second telescoping arm comprising a second nozzle at a first position on the second telescoping arm and a second suction blockage paddle located at a second position on the second telescoping arm, wherein during operation, simultaneous with the first telescoping arm being used to clean the first cassette filter, the vertical linear shaft and the horizontal linear shaft move the second telescoping arm to a second one of the cassette filters in order to position the second nozzle in front of the entry opening of the second cassette filter, the second telescoping arm then extends such that the second suction blockage paddle and the second nozzle move toward entry opening of the second cassette filter, the second suction blockage paddle then closes the entry opening of the second cassette filter and the second telescoping arm continues to extend the second nozzle within the interior of the second cassette filter while the second nozzle begins blowing cleaning air within the second cassette filter to clean the second cassette filter, after the second nozzle finishes cleaning the second cassette filter the second telescoping arm retracts the second nozzle and the second suction blockage paddle so that they are moved away from the entry opening of the second cassette filter, wherein the second cassette filter is spaced from the first cassette filter by a cassette filter that is not cleaned.

3. The filter unit according to claim 1, wherein the first telescoping arm further comprises wheels on an underneath section of the first telescoping arm which support the first telescoping arm within the interior of the first cassette filter.

\* \* \* \* \*